(12) United States Patent
Ichikawa et al.

(10) Patent No.: US 8,257,468 B2
(45) Date of Patent: Sep. 4, 2012

(54) CARBON MEMBRANE AND METHOD OF MANUFACTURING THE SAME

(75) Inventors: Akimasa Ichikawa, Nagoya (JP); Shogo Takeno, Nagoya (JP); Tetsuya Uchikawa, Nagoya (JP); Tetsuya Sakai, Toki (JP); Hideyuki Suzuki, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 259 days.

(21) Appl. No.: 12/635,069

(22) Filed: Dec. 10, 2009

(65) Prior Publication Data

US 2010/0083837 A1    Apr. 8, 2010

Related U.S. Application Data

(63) Continuation of application No. PCT/JP2009/058075, filed on Apr. 23, 2009.

(30) Foreign Application Priority Data

Jun. 10, 2008   (JP) .................................. 2008-152081

(51) Int. Cl.
*B01D 53/22* (2006.01)
(52) U.S. Cl. ............. 96/4; 55/523; 95/43; 96/10; 96/11
(58) Field of Classification Search ............ 55/523; 95/43; 96/4, 10, 11
See application file for complete search history.

(56) References Cited

U.S. PATENT DOCUMENTS

| 6,527,827 | B2 * | 3/2003 | Noack | 95/45 |
| 7,938,890 | B2 * | 5/2011 | Littau et al. | 96/4 |
| 7,947,114 | B2 * | 5/2011 | Hagg et al. | 95/51 |
| 2002/0000404 | A1 * | 1/2002 | Mutsakis et al. | 210/323.2 |
| 2002/0002903 | A1 * | 1/2002 | Noack | 95/45 |
| 2004/0231984 | A1 * | 11/2004 | Lauks et al. | 204/416 |
| 2005/0173334 | A1 * | 8/2005 | Andreoli et al. | 210/500.21 |
| 2009/0192297 | A1 * | 7/2009 | Yoshida et al. | 530/402 |
| 2010/0119769 | A1 * | 5/2010 | Watanabe et al. | 428/116 |

FOREIGN PATENT DOCUMENTS

| JP | 05-220360 A1 | 8/1993 |
| JP | 10-052629 A1 | 2/1998 |
| JP | 2000-237562 A1 | 9/2000 |
| JP | 2001-232156 A1 | 8/2001 |
| JP | 2003-286018 A1 | 10/2003 |
| JP | 2006-212480 A1 | 8/2006 |
| WO | 2007/088975 | 8/2007 |

OTHER PUBLICATIONS

Canadian Office Action, Canadian Application No. 2,691,305, dated Mar. 23, 2012 ((4 pages).

* cited by examiner

*Primary Examiner* — Jason M Greene
*Assistant Examiner* — Anthony Shumate
(74) *Attorney, Agent, or Firm* — Burr & Brown

(57) ABSTRACT

A porous carbon membrane has as a loaded component water, alcohol, ether, or ketone loaded on a surface or in a pore, or on the surface and in the pore thereof. The carbon membrane has the loaded component preferably having a molecular weight of 100 or less. The carbon membrane has the loaded component preferably being linear alcohol or linear ether. The carbon membrane has the loaded component preferably being at least one selected from methanol, ethanol, n-propanol, and n-butanol. There is provided a carbon membrane having high separation performance and little change in the separation performance with the passage of time.

16 Claims, 1 Drawing Sheet

CARBON MEMBRANE AND METHOD OF MANUFACTURING THE SAME

CROSS-REFERENCE TO RELATED APPLICATIONS

This application is a Continuation of International Application PCT/JP2009/058075, filed Apr. 23, 2009, which claims the benefit of Japanese Patent Application No. 2008-152081, filed Jun. 10, 2008.

FIELD OF THE INVENTION

The present invention relates to a carbon membrane and a method for manufacturing the same, and, in more detail, to a carbon membrane having high separation performance and little change in the separation performance with the passage of time and a method for manufacturing a carbon membrane capable of obtaining such a carbon membrane.

BACKGROUND OF THE INVENTION

Conventionally, there has been proposed the use of a carbon membrane excellent in thermal resistance and chemical stability as a separation membrane for separating specific gas or the like from a mixture of various gases or the like, or as a separation membrane for separating a specific component from a mixed liquid or an aqueous solution of various organic solvent such as alcohol from the viewpoint of environment and energy saving (see, e.g., Patent Documents 1 and 2).
Patent Document 1: JP-A-2003-286018
Patent Document 2: JP-A-2006-212480

When the carbon membrane was left at room temperature, water or the like was adsorbed to an oxygen contained functional group or the like slightly present on a carbon membrane surface to sometimes deteriorate permeation performance and separation performance of the carbon membrane. In contrast, the invention described in the Patent Document 1 tries to inhibit absorption of a water molecule and inhibit deterioration in permeation performance by subjecting a surface of the carbon membrane to a silylation treatment to impart hydrophobicity to the carbon membrane. Though the invention described in Patent Document 1 can effectively inhibit adsorption of a water molecule to the surface of the carbon membrane, the pore size of the carbon membrane is decreased by silylation, and as a result, the permeability rate falls off. Therefore, there is room to study further. In addition, the invention described in Patent Document 2 improves hydrophilicity of the membrane by immersing the carbon membrane in an acidic aqueous solution to allow a molecule of an acidic substance to be adsorbed, thereby improving selectivity of water in separation of water from an organic solvent such as water and alcohol. Though this particularly exhibits an effect in the case that the separation target is an organic solvent containing water, an effect against a mixed liquid of organic solvents or gas is uncertain. In addition, since an acidic substance such as acetic acid and hydrochloric acid is used, there are problems of odor, safety, and the like.

SUMMARY OF THE INVENTION

The present invention has been made in view of the above problems and is characterized by providing a carbon membrane having high permeation performance and separation performance and little change in the separation performance with the passage of time and a method for manufacturing such a carbon membrane.

In order to achieve the above aim, according to the present invention, there are provided the following carbon membrane and the manufacturing method.

According to a first aspect of the present invention, a porous carbon membrane is provided, having as a loaded component water, alcohol, ether, or ketone loaded on a surface or in a pore, or on the surface and in the pore thereof.

According to a second aspect, the carbon membrane according to the first aspect is provided, wherein the loaded component has a molecular weight of 100 or less.

According to a third aspect, the carbon membrane according to the first or second aspects is provided, where the loaded component is linear alcohol or linear ether.

According to a fourth aspect, the carbon membrane according to any one of the first to third aspects is provided, wherein the loaded component is at least one selected from methanol, ethanol, n-propanol, and n-butanol.

According to a fifth aspect, the carbon membrane according to any one of the first to fourth aspects is provided, wherein a mass of the loaded component with respect to the mass of the membrane is 100 ppm or more.

According to a sixth aspect, the carbon membrane according to any one of the first to fifth aspects is provided, wherein the mass of the loaded component with respect to the mass of the membrane is 5000 ppm or less.

According to a seventh aspect, the carbon membrane according to any one of the first to sixth aspects is provided, wherein the average pore size is 0.2 to 1.0 nm.

According to an eighth aspect, the carbon membrane according to any one of the first to seventh aspects is provided, which is formed on a surface of a porous substrate.

According to a ninth aspect, the carbon membrane according to the eighth aspect is provided, wherein the porous substrate is a ceramic porous body having an average pore size of 0.01 to 10 μm and a porosity of 30 to 70%.

According to a tenth aspect, the carbon membrane according to any one of the first to nineth aspects is provided, wherein, by removing the loaded component by a heating treatment at 300° C. for one hour, a water permeation flux becomes 200% or less of that before the heating treatment, and an ethanol permeation flux becomes 200% or more of that before the heating treatment.

According to an eleventh aspect, the carbon membrane according to any one of the first to tenth aspects is provided, wherein the thickness is 0.01 to 10 μm.

According to a twelfth aspect, a method for manufacturing a carbon membrane comprising: forming a carbon membrane on a surface of a hollow string-shaped or porous substrate to manufacture an untreated carbon membrane; allowing water, alcohol, ether, or ketone to permeate the untreated carbon membrane or immersing the untreated carbon membrane in water, alcohol, ether, or ketone; and then loading various components on a surface or in a pore, or on the surface and in the pore thereof by heat-drying at 50 to 200° C.

According, to a thirteenth aspect, the method for manufacturing a carbon membrane according to the twelfth aspect is provided, wherein the carbon membrane is obtained by performing, 1 to 10 times, an operation of allowing water, alcohol, ether, or ketone to permeate the untreated carbon membrane for 1 second to 5 hours at 0 to 200° C. with a permeation flex of 0.01 to 10 kg/m²·hour, followed by heat-drying at 50 to 200° C.

According to a fourteenth aspect the method for manufacturing a carbon membrane according to the twelfth aspect is provided, wherein the carbon membrane is obtained by performing, 1 to 10 times, an operation of immersing the untreated carbon membrane in water, alcohol, ether, or ketone at 50 to 100° C. for 1 minute to 24 hours, followed by heat-drying at 50 to 200° C.

According to a fifteenth aspect, the method for manufacturing a carbon membrane according to any one of the twelfth to fourteenth aspects is provided, wherein the thickness of the carbon membrane is 0.01 to 10 µm.

According to a sixteenth aspect the method for manufacturing a carbon membrane according to any one of the twelfth to fifteenth aspects is provided, wherein the porous substrate is a ceramic porous body having an average pore size of 0.01 to 10 µm and a porosity of 30 to 70%.

According to a seventeenth aspect, the method for manufacturing a carbon membrane according to any one of the twelfth to sixteenth aspects, wherein an untreated carbon membrane is manufactured by forming a precursor by disposing a precursor of a carbon membrane on a surface of the porous substrate, followed by subjecting the precursor to a thermal treatment at 400 to 1200° C. to carbonize the precursor.

According to a carbon membrane of the present invention, since water, alcohol, ether, or ketone is loaded in a pore thereof, the pore of the carbon membrane has a structure where a desired molecule easily permeates and where the other molecules hardly permeate to have high selectivity and permeability. In addition, since the aforementioned water, alcohol, or the like is previously loaded in the pores, the carbon membrane of the present invention can inhibit a water molecule or the like in air to further be adsorbed and further inhibit the pores from being clogged due to the use of the carbon membrane to have little change in separation performance with the passage of time. According to a method for manufacturing a carbon membrane of the present invention, water, alcohol, ether, or ketone is loaded in the pores of the carbon membrane by immersing an untreated carbon membrane in water, alcohol, ether, or ketone, followed by heat-drying at 50 to 200° C. to be able to efficiently manufacture a carbon membrane of the present invention.

DESCRIPTION OF REFERENCE NUMERALS

1: slit-shaped pore: and 2: loaded component.

DETAILED DESCRIPTION OF THE INVENTION

Hereinbelow, the best mode for carrying out the present invention will specifically be described. However, the present invention is not limited to the following embodiment, and it should be understood that changes, improvements, and the like of the design may suitably be made on the basis of ordinary knowledge of a person of ordinary skill within the range of not deviating from the gist of the present invention.

An embodiment of a carbon membrane of the present invention is a porous membrane having as a loaded component water, alcohol, ether, or ketone loaded on a surface or in a pore, or on the surface and in the pore thereof. The porous carbon membrane of the present invention is a molecular sieve carbon membrane, and the molecular sieve carbon membrane means a carbon membrane having a characteristic of allowing or not allowing a specific molecule to permeate to separate the specific molecule from a mixture containing the specific molecule.

Figure 1A:
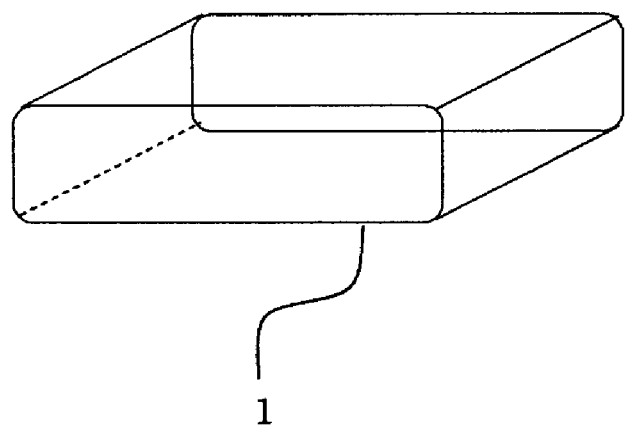
FIG. 1A is a perspective view showing a part of a slit-shaped pore formed in a carbon membrane of the present invention and showing a state before the loaded component is loaded in the pore.
Figure 1B:
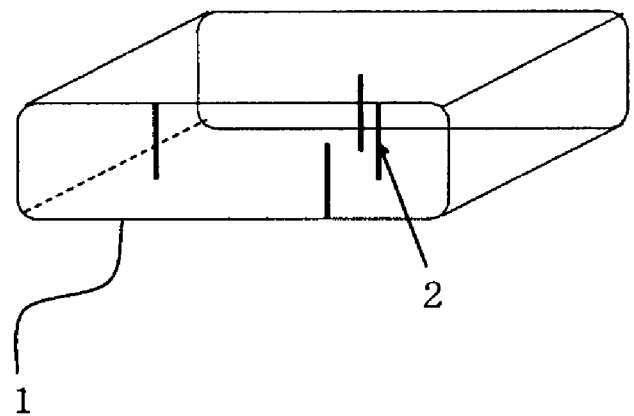
FIG. 1B is a perspective view showing a part of a slit-shaped pore formed in a carbon membrane of the present invention and showing a state that the loaded component is loaded in the pore.

The pore shape of the carbon membrane is considered to be generally a slit shape as shown in FIG. 1A. The inventors found out that the selectivity improves by loading water, alcohol, ether, or ketone on the carbon membrane. Further, from a large number of findings obtained from these experiments, they considered that the reason for improvement in selectivity by loading water, alcohol, ether, or ketone on the carbon membrane is that, by allowing these components to be loaded in slit-shaped pores 1 by adsorption, an addition reaction, or the like to form a wedge-shaped steric barrier (loaded component 2), and thereby a component having a large molecule diameter, in particular, a linear or a planar component hardly passes through the pores. Based on this idea, they found out also that linear alcohol or linear ether is suitable as the loaded component 2; that at least one selected from methanol, ethanol, n-propanol, and n-butanol is furthermore suitable; and that a carbon membrane having both high selectivity and permeability can be obtained by using them as the loaded component. Incidentally, FIG. 1A is a perspective view showing a part of a slit-shaped pore formed in a carbon membrane of the present invention and showing a state before the loaded component is loaded in the pore. FIG. 1B is a perspective view showing a part of a slit-shaped pore formed in a carbon membrane of the present invention and showing a state that the loaded component is loaded in the pore. In FIGS. 1A and 1B, regarding the slit-shaped pore 1, a pore space is shown, and the carbon membrane itself (wall of the carbon membrane) is not shown.

The loaded component has a molecular weight of preferably 100 or less, more preferably 30 to 100, particularly preferably 40 to 100. When the molecular weight of the loaded component is above 100, the pores may be clogged to decrease a permeation amount of the target substance. In addition, when the molecular weight is below 30, an effect as a steric barrier may be decreased.

In a carbon membrane of the present embodiment, a mass of the loaded component with respect to the mass of the membrane is preferably 100 ppm or more. When it is below 100 ppm, the effect in improving selectivity may be decreased. In addition, the mass of the loaded component with respect to the mass of the membrane is preferably 5000 ppm or less. When it is above 5000 ppm, the pores may be clogged to decrease a permeation amount of the target substance.

In the carbon membrane of the present embodiment, the average pore size is preferably 0.2 to 1.0 nm. When the average pore size is below 0.2 nm, the loaded component may clog the pores to decrease a permeation amount of the target substance. When it is above 1.0 nm, the effect in improving selectivity may be decreased.

The thickness of the carbon membrane of the present embodiment is preferably 0.01 to 10 µm, more preferably 0.01 to 0.5 µm. When it is less than 0.01 µm, selectivity may be decreased, and strength may be decreased. When it is above 10 µm, permeability of the fluid may be decreased.

The carbon membrane of the present embodiment is preferably formed on a surface of the porous substrate. This can improve strength and durability of the carbon membrane. Though the porous substrate is not particularly limited, it is preferably a ceramic porous body having an average pore size of 0.01 to 10 µm and a porosity of 30 to 70%. When the average pore size is below 0.01 μm, pressure loss may be increased, while, when it is above 10 μm, strength of the porous substrate may be decreased. In addition, when the porosity is below 30%, the permeability of the target component may be decreased, while, when it is above 70%, strength of the porous substrate may be decreased. As the material for the porous substrate, alumina, silica, cordierite, and the like can be pointed out. In addition, the shape of the porous substrate is not particularly limited and suitably selected in accordance with the intended use, and, for example, a monolith shape, a honeycomb shape, a disc shape, a polygonal plate shape, a cylindrical shape such as a circular cylindrical shape or a prismatic cylindrical shape, and a columnar shape such as a circular columnar shape or a prismatic columnar shape. Since the membrane area ratio to the capacity and the weight is high, it is particularly desirable to be a monolith shape or a honeycomb shape. In addition, the size of the porous substrate is not particularly limited and can be determined in accordance with the purpose within the range where necessary strength is satisfied as a support and where permeability of the gas to be separated does not degrade the permeability.

The carbon membrane of the present embodiment is preferably the one where, by removing the loaded component by a heating treatment at 300° C. for one hour, a "water permeation flux becomes 200% or less of that before the heating treatment, and an ethanol permeation flux becomes 200% or more of that before the heating treatment". By satisfying such conditions, desired components can effectively be separated from each other.

An embodiment of a method for manufacturing a carbon membrane of the present invention is the one including: forming a carbon membrane on a surface of a hollow string-shaped or porous substrate to manufacture an untreated carbon membrane; allowing water, alcohol, ether, or ketone to permeate the untreated carbon membrane or immersing the untreated carbon membrane in water, alcohol, ether, or ketone; and then loading various components on a surface or in a pore, or on the surface and in the pore thereof by heat-drying at 50 to 200° C. Hereinbelow, description will be made by each step.

(Manufacturing of Untreated Carbon Membrane)

The method for manufacturing an untreated carbon membrane is not particularly limited, and, for example, it can be obtained by forming a porous carbon membrane on the surface of the porous substrate. In addition, it can be formed as a single membrane by a method, for example, for forming a hollow string membrane without using a porous substrate. A method for forming a porous carbon membrane on a surface of the porous substrate is as follows.

In the first place, it is preferable that a precursor-disposed article is formed by disposing a precursor of a carbon membrane on a surface of the porous substrate. In a method for manufacturing an untreated carbon membrane-disposed body, though there is no particular limitation on the porous substrate, it is preferably the same as the porous substrate used in the aforementioned carbon membrane of the present invention.

As the carbon membrane precursor disposed on the surface of the porous substrate, for example, polyimide resin, lignin, phenol resin, polyvinylidene chloride, polyacrylonitrile, polyfurfuryl alcohol, polyphenylene oxide, cellulose, and the like may suitably be used. There is no particular limitation on the carbon membrane precursor as long as it can become a carbon membrane.

A method for disposing a polyimide resin or phenol resin precursor on a surface of the porous substrate will be described in more detail. In the first place, it is preferable to apply a polyamide acid or phenol resin solution as a precursor for polyimide resin on a surface of the porous substrate by a spin coat method, dip method, or the like, for disposition. Then, the porous substrate having the polyamide acid or phenol resin applied thereon is subjected to a thermal treatment at 90 to 300° C. for 0.5 to 60 hours to obtain a precursor-disposed article having polyimide resin or phenol resin, which is a carbon membrane precursor, on the surface thereof. The thickness of a carbon membrane precursor is preferably 0.01 to 10 μm, more preferably 0.01 to 0.5 μm.

Next, carbonization is performed by subjecting the carbon membrane precursor to a thermal treatment under predetermined conditions to obtain an untreated carbon membrane where a carbon membrane is disposed on a surface of the porous substrate. The atmosphere when the precursor is thermally treated is preferably a non-oxidation atmosphere. The non-oxidation atmosphere means an atmosphere where the carbon membrane precursor is not oxidized even by heating in a temperature range upon the thermal treatment and specifically means an atmosphere such as an inert gas of nitrogen, argon, or the like; a vacuum; or the like.

The temperature upon subjecting the carbon membrane precursor to the thermal treatment is preferably 400 to 1200° C., more preferably 600 to 900° C. When the temperature is below 400° C., there is the case that the carbonization is insufficient and that pores cannot be formed, and thereby the separation performance is not exhibited. When it is above 1200° C., strength may be decreased, or the membrane may become too dense, which may decrease separation performance.

In addition, in the untreated carbon membrane-disposed article obtained, the untreated carbon membrane has a thickness of preferably 0.01 to 10 μm, more preferably 0.01 to 0.5 μm.

Incidentally, a method for forming the carbon membrane as a single membrane by a method such as manufacturing a hollow string membrane or a film without using a porous substrate is as follows. In the first place, a hollow string membrane is formed by a method such as adjusting a polyamide acid or phenol resin solution as a precursor for polyimide resin as a raw material for a carbon membrane and extruding it into a hollow string shape from a spinning nozzle to immerse it in a solidification solvent for solidification. Then, carbonization is performed by a thermal treatment under predetermined conditions to obtain an untreated carbon membrane.

(Manufacture of Carbon Membrane)

Next, water, alcohol, ether, or ketone is allowed to permeate the obtained untreated carbon membrane or the carbon film is immersed in water, alcohol, ether, or ketone. Thereby, the aforementioned water, alcohol, ether, or ketone (hereinbelow, these components are sometimes referred to as "loaded components") is loaded in the pores of the carbon membrane. This enables to improve selectivity of a desired component when various mixed gases or mixed liquids are separated. In addition, when the obtained carbon membrane is stored, and when the carbon membrane is used for separation of a target substance, water in the stored atmosphere, various components or the like in the target substance are inhibited from being further adsorbed in the pores to clog the pores, and high permeability can be maintained stably. In addition, by employing at least one selected from linear alcohol and linear ether, more preferably methanol, ethanol, n-propanol, and n-butanol as the loaded component, a carbon membrane having both high selectivity and high permeability can be obtained.

As conditions for allowing water, alcohol, ether, or ketone (hereinbelow sometimes referred to as a "substance to be allowed to permeate") to permeate the untreated carbon membrane, it is preferable to set the permeation flux to be 0.01 to 10 kg/m$^2$·hour, the temperature to be 0 to 200° C., and the permeation time to be 1 second to 5 hours; and it is more preferable to set the permeation flux to be 0.1 to 1 kg/m$^2$·hour, the temperature to be 20 to 100° C., and the permeation time to be 10 seconds to 1 hour. When the permeation flux is below 0.01 kg/m$^2$·hour, the treatment time may become long, while, when it is above 10 kg/m$^2$·hour, a large amount of substances to be allowed to permeate is required. In addition, when the temperature of the substance to permeate is below 0° C., permeation flux may not be obtained. When it is above 200° C., a risk such as catching fire of the permeable substance may increase. When the time for permeation is below 1 second, it may be difficult for the loaded component to be adsorbed in the pores, while, when it is above 5 hours, long time may be spent unnecessarily.

In addition, as conditions for immersing the untreated carbon membrane in water, alcohol, ether, or ketone, it is preferable to set the temperature to be 50 to 100° C. and the immersion time to be 1 minute to 24 hour. When the temperature for immersion is below 50° C., it may be difficult for loaded component to be loaded, while, when it is above 100° C., a risk such as catching fire of the loaded component may increase. When the time for immersion is below 1 minute, it may become difficult for the loaded component to be adsorbed in the pores of the carbon membrane, while, when it is above 24 hours, long time may be spent unnecessarily.

Next, after the loaded component is adsorbed in pores of the untreated carbon membrane, the loaded component is bonded more strongly by heating to obtain a carbon membrane. The temperature for the heating is from 50 to 200° C. When the temperature is below 50° C., it may be difficult for the loaded component to bond to the carbon membrane. In addition, a high temperature condition higher than 200° C. is not necessary. It is preferable that the carbon membrane has an average pore size of 0.2 to 1.0 nm.

Further, it is preferable to obtain the carbon membrane by performing, 1 to 10 times, an operation (hereinbelow sometimes referred to as a "permeation-loading operation") of allowing the water, alcohol, ether, or ketone to permeate the untreated carbon membrane for 1 second to 5 hours at 0 to 200° C. with a permeation flex of 0.01 to 10 kg/m$^2$·hour, followed by heat-drying at 50 to 200° C. When the number of the aforementioned permeation-loading operations is above ten, there may be many operations unnecessarily.

In addition, it is preferable to obtain the carbon membrane by performing, 1 to 10 times, an operation (hereinbelow sometimes referred to as an "immersion-loading operation") of immersing the untreated carbon membrane in water, alcohol, ether, or ketone at 50 to 100° C. for 1 to 24 hours, followed by heat-drying at 50 to 200° C. When the number of times of the aforementioned immersion-loading operations is above ten, there may be many operations unnecessarily.

When the aforementioned loaded component is loaded in the pores of the carbon membrane, it is preferable that the load amount reaches saturation to be in a state that loading is not caused any more. This enables to maintain high separation performance more stably when the carbon membrane is stored or used.

As alcohol of the loaded component, at least one kind selected from methanol, ethanol, n-propanol, and n-butanol is preferable.

The thickness of the obtained carbon membrane is preferably 0.01 to 10 µm, more preferably 0.01 to 0.5 µm. When it is below 0.01 µm, strength and durability may be decreased, while, when it is above 10 µm, pressure loss upon permeation of the target substance to be separated may increase.

EXAMPLE

Hereinbelow, the present invention may be described more specifically by Examples. However, the present invention is by no means limited to these Examples.

(Formation of a Carbon Membrane on a Surface of a Porous Substrate)

A carbon membrane was formed on a surface of a porous substrate by the following method. A commercially available polyimide resin precursor varnish (U-varnish A produced by Ube Industries, Ltd.) or phenol resin (Bellpearl S899 produced by Air Water Inc.) was diluted or dissolved by N-methyl-2-pyrrolidone to adjust the concentration to be 10 mass %. These solutions were subjected to dip coat on a monolith-shaped alumina porous substrate having a surface average pore size of 0.1 µm to obtain carbon membrane precursors of the resins, followed by drying. These precursors were subjected to a thermal treatment at 500 to 1200° C. for one hour in a vacuum or nitrogen atmosphere to obtain carbon membranes 1 to 31. The precursors, carbonization atmospheres, and carbonization temperatures are shown in Table 1. The obtained carbon membranes each had a structure where a carbon membrane was formed on wall surfaces of a plurality of flow passages of the monolith-shaped porous substrate. Of these, the carbon membranes 1 to 26 were subjected to the loading treatment described in the following clause. The carbon membranes 27 to 31 were not subjected to the loading treatment and served as Comparative Examples 1 to 5.

(Loading Treatment)

Each of the carbon membranes was subjected to a penetration treatment for five minutes with each of the loaded components (water, methanol, ethanol, n-propanol, i-propanol, n-butanol, n-octanol, diethylether, acetone, and methylethyl keton) shown in Table 1, followed by heating at 100° C. for 64 hours. Here, the penetration treatment means a treatment method where a surface on one side of the carbon membrane is filled with various liquids or steam thereof in atmospheric pressure or in a pressurization state, and pressure is reduced on the other side to compulsorily pass each of the components through the membrane. The aforementioned loading treatment operation was performed three times for Example 3, five times for Example 14, and once for the others to obtain carbon membranes where various components were loaded (Examples 1 to 26). Two carbon membranes were manufactured for loaded component concentration analysis, and two carbon membranes were also manufactured for separation performance and durability performance evaluations.

(Quantitative Determination of Loaded Component Concentration)

Only a membrane portion formed on the substrate was taken out by scraping from the carbon membrane, and a powdery sample for analysis was manufactured. Each sample was precisely weighed, and, after the sample was put in a glass tube for thermal desorption, the both ends were plugged with glass wool to obtain a sample. Gas desorbed by raising temperature up to 280° C. for five minutes after preliminary drying at 80° C. for five minutes was analyzed by the GC-FID. On the other hand, CHN analysis was performed to measure the CHN amount in the sample, and concentration of the loaded component with respect to the total amount thereof was calculated. The number of loading treatments and the concentration of the loaded component are shown in Table 1.

(Evaluation for Separation Performance and Durability Performance)

With respect to the carbon membranes of Examples 1 to 26 and Comparative Examples 1 to 5 obtained in the aforementioned method, water/ethanol penetration-vaporization separation (fed liquid composition water/ethanol=10/90 mass %, fed liquid temperature of 70° C., permeation side pressure of 50 Torr) was performed to obtain separation coefficient α and permeation flux (Flux) (kg/m²h). Further, regarding the aforementioned carbon membrane, permeation coefficient (pressure of 0.1 MPa) (gas permeation coefficient (nmol/Pa·m²·s)) of single component gas was obtained. "nmol" shows "$10^{-9}$ mol". In addition, after each of the carbon membranes was left for three days in the atmosphere, gas permeation coefficient of He, $O_2$, and $CH_4$ among the single component gas were measured to evaluate for durability performance of the membrane (after being left in the atmosphere (nmol/Pa·m²·s)). The results are shown in Table 2. In addition, regarding Comparative Example 2 and Examples 5 to 12, water/acetic acid penetration-vaporization separation (fed liquid composition water/acetic acid=30/70 mass %, fed liquid temperature of 70° C., permeation side pressure of 50 Torr) was performed to obtain separation coefficient α and permeation flux (Flux) (kg/m²h). Further, regarding Comparative Example 2 and Examples 5 to 12, water/i-propanol penetration-vaporization separation (fed liquid composition water/i-propanol=10/90 mass %, fed liquid temperature of 70° C., permeation side pressure of 50 Torr) was performed to obtain separation coefficient α and permeation flux (Flux) (kg/m²h). The results are shown in Table 3.

(Measurement for Change of Permeation Flux Due to Presence/Absence of Loaded Substance)

After the permeation flux (Flux) of each carbon membrane with respect to each of water and ethanol was measured (before heating treatment) at fed liquid temperature of 70° C. and permeation side pressure of 50 Torr, it was heated at 300° C. for one hour in the atmosphere to remove the loaded substance, followed by measurement (after heating treatment) of the permeation flux (Flux) again in the same manner as in the case before heating to evaluate for the change of permeation flux (Flux). The results are shown in Table 4.

TABLE 1

| | Precursor | Carbonization atmosphere | Carbonization temperature (° C.) | Loaded component | Number of loading treat-Ment | Loaded component concentration (ppm) |
|---|---|---|---|---|---|---|
| Example 1 | Polyimide | Nitrogen | 500 | Ethanol | 1 | 500 |
| Example 2 | Polyimide | Nitrogen | 600 | Methanol | 1 | 360 |
| Example 3 | Polyimide | Vacuum | 600 | n-butanol | 3 | 240 |
| Example 4 | Polyimide | Nitrogen | 600 | Methylethyl ketone | 1 | 670 |
| Example 5 | Polyimide | Nitrogen | 700 | Ethanol | 1 | 730 |
| Example 6 | Polyimide | Nitrogen | 700 | n-octanol | 1 | 210 |
| Example 7 | Polyimide | Nitrogen | 700 | i-propanol | 1 | 430 |
| Example 8 | Polyimide | Nitrogen | 700 | Diethyl ether | 1 | 710 |
| Example 9 | Polyimide | Nitrogen | 700 | n-propanol | 1 | 560 |
| Example 10 | Polyimide | Nitrogen | 700 | Water | 1 | 220 |
| Example 11 | Polyimide | Vacuum | 700 | Acetone | 1 | 490 |
| Example 12 | Polyimide | Nitrogen | 700 | Methanol | 1 | 850 |
| Example 13 | Polyimide | Nitrogen | 800 | n-propanol | 1 | 470 |
| Example 14 | Polyimide | Vacuum | 800 | Ethanol | 5 | 5000 |
| Example 15 | Polyimide | Nitrogen | 900 | Ethanol | 1 | 680 |
| Example 16 | Polyimide | Nitrogen | 1000 | Water | 1 | 140 |
| Example 17 | Polyimide | Nitrogen | 1200 | Ethanol | 1 | 100 |
| Example 18 | Phenol | Nitrogen | 600 | Ethanol | 1 | 520 |
| Example 19 | Phenol | Nitrogen | 600 | Methylethyl ketone | 1 | 660 |
| Example 20 | Phenol | Nitrogen | 600 | Diethyl ether | 1 | 690 |
| Example 21 | Phenol | Nitrogen | 700 | n-propanol | 1 | 420 |
| Example 22 | Phenol | Nitrogen | 700 | i-propanol | 1 | 410 |
| Example 23 | Phenol | Nitrogen | 700 | Methanol | 1 | 780 |
| Example 24 | Phenol | Nitrogen | 800 | Water | 1 | 250 |
| Example 25 | Phenol | Nitrogen | 800 | Aceton | 1 | 380 |
| Example 26 | Phenol | Nitrogen | 800 | n-butanol | 1 | 180 |
| Comp. Ex. 1 | Polyimide | Nitrogen | 600 | — | — | — |
| Comp. Ex. 2 | Polyimide | Nitrogen | 700 | — | — | — |
| Comp. Ex. 3 | Polyimide | Nitrogen | 900 | — | — | — |
| Comp. Ex. 4 | Polyimide | Nitrogen | 1200 | — | — | — |
| Comp. Ex. 5 | Phenol | Nitrogen | 700 | — | — | — |

TABLE 2

| | Separation coefficient α | Flux (kg/m²h) | Gas permeation coefficient (nmol/Pa · m² · s) | | | | | | | After leaving in the atmospere | | |
|---|---|---|---|---|---|---|---|---|---|---|---|---|
| | water/ethanol | water/ethanol | He | $H_2$ | $CO_2$ | $O_2$ | $N_2$ | $CH_4$ | $SF_6$ | $H_2$ | $O_2$ | $CH_4$ |
| Example 1 | 46 | 1.1 | 54 | 52 | 13 | 4.5 | 1.8 | 1.6 | 0.55 | 55 | 4.4 | 1.6 |
| Example 2 | 11 | 2.2 | 380 | 460 | 102 | 43 | 12 | 12 | 1.6 | 370 | 42 | 12 |
| Example 3 | 33 | 1.7 | 290 | 370 | 76 | 18 | 3.3 | 3.1 | 0.89 | 290 | 18 | 3.1 |
| Example 4 | 28 | 1.7 | 300 | 340 | 75 | 18 | 3.4 | 3.3 | 0.88 | 290 | 19 | 3.2 |
| Example 5 | 126 | 1.3 | 60 | 47 | 7.4 | 2.1 | 0.72 | 0.85 | 0.24 | 61 | 2.0 | 0.85 |

TABLE 2-continued

| | Separation coefficient α water/ethanol | Flux (kg/m²h) water/ethanol | Gas permeation coefficient (nmol/Pa · m² · s) | | | | | | | After leaving in the atmospere | | |
|---|---|---|---|---|---|---|---|---|---|---|---|---|
| | | | He | $H_2$ | $CO_2$ | $O_2$ | $N_2$ | $CH_4$ | $SF_6$ | $H_2$ | $O_2$ | $CH_4$ |
| Example 6 | 148 | 1.1 | 55 | 43 | 6.6 | 1.8 | 0.65 | 0.62 | 0.20 | 54 | 1.8 | 0.61 |
| Example 7 | 112 | 1.0 | 51 | 45 | 6.5 | 1.8 | 0.64 | 0.62 | 0.25 | 51 | 1.7 | 0.62 |
| Example 8 | 135 | 1.2 | 58 | 46 | 7.2 | 2.0 | 0.74 | 0.78 | 0.23 | 58 | 2.0 | 0.77 |
| Example 9 | 132 | 1.2 | 56 | 45 | 7.2 | 1.9 | 0.75 | 0.76 | 0.22 | 57 | 1.9 | 0.76 |
| Example 10 | 32 | 1.6 | 123 | 94 | 26 | 9.3 | 1.7 | 1.6 | 0.65 | 120 | 9.2 | 1.5 |
| Example 11 | 104 | 1.0 | 54 | 41 | 6.3 | 1.6 | 0.70 | 0.70 | 0.28 | 54 | 1.6 | 0.70 |
| Example 12 | 97 | 1.4 | 78 | 66 | 8.8 | 4.8 | 1.2 | 1.3 | 0.44 | 77 | 4.8 | 1.2 |
| Example 13 | 251 | 0.8 | 44 | 37 | 5.0 | 1.2 | 0.11 | 0.10 | 0.02 | 44 | 1.2 | 0.10 |
| Example 14 | 233 | 0.9 | 47 | 39 | 5.3 | 1.3 | 0.14 | 0.13 | 0.02 | 46 | 1.3 | 0.13 |
| Example 15 | 597 | 0.6 | 31 | 25 | 3.9 | 0.99 | 0.08 | 0.08 | 0.01 | 31 | 0.98 | 0.08 |
| Example 16 | 2300 | 0.5 | 29 | 24 | 3.1 | 0.54 | 0.03 | 0.03 | — | 29 | 0.54 | 0.03 |
| Example 17 | 32000 | 0.2 | 6.0 | 5.8 | 0.03 | 0.01 | — | — | — | 6.0 | 0.01 | — |
| Example 18 | 74 | 1.3 | 121 | 120 | 33 | 9.2 | 1.3 | 0.72 | 0.21 | 120 | 9.1 | 0.71 |
| Example 19 | 65 | 1.1 | 110 | 108 | 30 | 9.3 | 1.4 | 0.70 | 0.20 | 110 | 9.3 | 0.70 |
| Example 20 | 68 | 1.2 | 116 | 115 | 32 | 9.1 | 1.2 | 0.72 | 0.19 | 116 | 9.1 | 0.71 |
| Example 21 | 126 | 1.0 | 97 | 95 | 23 | 5.3 | 0.31 | 0.22 | 0.08 | 96 | 5.3 | 0.22 |
| Example 22 | 114 | 0.9 | 91 | 90 | 22 | 5.1 | 0.30 | 0.20 | 0.07 | 90 | 5.2 | 0.20 |
| Example 23 | 112 | 0.8 | 86 | 86 | 17 | 4.8 | 0.24 | 0.16 | 0.05 | 87 | 4.8 | 0.15 |
| Example 24 | 187 | 0.6 | 68 | 67 | 7.4 | 1.3 | 0.04 | 0.03 | — | 68 | 1.3 | 0.03 |
| Example 25 | 342 | 0.5 | 52 | 47 | 5.1 | 0.78 | 0.02 | 0.01 | — | 51 | 0.77 | 0.01 |
| Example 26 | 356 | 0.6 | 64 | 60 | 4.8 | 0.75 | 0.01 | 0.01 | — | 64 | 0.75 | 0.01 |
| Comp. Ex. 1 | 5 | 4.0 | 1160 | 4220 | 4400 | 1960 | 1220 | 2650 | 3.0 | 20 | 2.1 | — |
| Comp. Ex. 2 | 4 | 5.2 | 930 | 1380 | 1410 | 450 | 160 | 245 | 16 | 12 | 1.3 | — |
| Comp. Ex. 3 | 20 | 0.6 | 44 | 52 | 55 | 21 | 3.6 | 0.87 | 0.11 | 0.5 | — | — |
| Comp. Ex. 4 | 25 | 0.3 | 10 | 13 | 13 | 3.2 | 1.1 | 0.24 | 0.02 | — | — | — |
| Comp. Ex. 5 | 3 | 3.5 | 780 | 1010 | 1050 | 340 | 110 | 120 | 8.4 | 15 | 1.4 | — |

TABLE 3

| | Separation coefficient α Water/acetic acid | Flux (kg/m²h) Water/acetic acid | Separation coefficient α Water/i-propanol | Flux (kg/m²h) Water/i-propanol |
|---|---|---|---|---|
| Example 5 | 42 | 1.0 | 2270 | 1.3 |
| Example 6 | 49 | 0.9 | 2640 | 1.1 |
| Example 7 | 35 | 0.8 | 2050 | 1.0 |
| Example 8 | 47 | 1.0 | 2430 | 1.2 |
| Example 9 | 44 | 1.0 | 2340 | 1.2 |
| Example 10 | 12 | 1.3 | 480 | 1.4 |
| Example 11 | 33 | 0.8 | 1860 | 1.0 |
| Example 12 | 30 | 1.1 | 1750 | 1.3 |
| Comp. Ex. 2 | 3 | 4.2 | 6 | 3.5 |

TABLE 4

| | Before heating treatment | | After heating treatment | | Change in flux (times) | |
|---|---|---|---|---|---|---|
| | Flux(kg/m²h) Water | Flux(kg/m²h) Ethanol | Flux(kg/m²h) Water | Flux(kg/m²h) Ethanol | Water | Ethanol |
| Example 1 | 1.8 | 0.5 | 2.0 | 1.8 | 1.1 | 3.6 |
| Example 2 | 4.6 | 1.3 | 5.0 | 3.8 | 1.1 | 2.9 |
| Example 3 | 3.8 | 1.2 | 5.0 | 3.8 | 1.3 | 3.2 |
| Example 5 | 3.6 | 0.1 | 4.8 | 4.5 | 1.3 | 45.0 |
| Example 10 | 3.6 | 1.0 | 4.8 | 4.5 | 1.3 | 4.5 |
| Example 11 | 3.4 | 0.1 | 4.8 | 4.5 | 1.4 | 45.0 |
| Example 14 | 2.4 | 0.04 | 2.5 | 0.9 | 1.04 | 22.5 |
| Example 15 | 1.3 | 0.02 | 1.4 | 0.4 | 1.08 | 20.0 |
| Example 17 | 1.0 | 0.01 | 1.1 | 0.2 | 1.10 | 20.0 |
| Example 21 | 3.2 | 0.2 | 4.5 | 4.0 | 1.41 | 20.0 |
| Example 24 | 2.4 | 0.1 | 3.2 | 1.8 | 1.33 | 18.0 |
| Comp. Ex. 1 | 4.8 | 3.7 | 5.0 | 3.8 | 1.04 | 1.03 |
| Comp. Ex. 2 | 4.5 | 4.3 | 4.8 | 4.5 | 1.07 | 1.05 |
| Comp. Ex. 3 | 1.2 | 0.3 | 1.4 | 0.4 | 1.17 | 1.33 |
| Comp. Ex. 4 | 1.0 | 0.2 | 1.1 | 0.2 | 1.10 | 1.00 |
| Comp. Ex. 5 | 4.3 | 3.9 | 4.5 | 4.0 | 1.05 | 1.03 |

As shown in Table 1 to 4, in Examples 1 to 26, where a loading treatment was performed, it was found out that selectivity of water/ethanol, water/acetic acid, and water/i-propanol was drastically improved in comparison with the Comparative Examples 1 to 5, which were not treated. In addition, regarding single component gas, it was found out that selectivity of $H_2/CO_2$ and the like was improved. Further, as a loaded component, the case that a linear alcohols or ethers were loaded showed the tendency of higher selectivity and higher permeability than in the case of loading ketones or branched alcohols. The cause of improving separation performance is considered that, as shown in FIG. 1A, a carbon membrane has a slit-shaped molecular sieve pore formed therein, and a component loaded in the pore forms a wedge-shaped steric barrier to change the pore structure. As shown in FIG. 1B, as a result of forming a wedge-shaped steric barrier, it can be considered that, since a linear or planar molecule having a long longitudinal axis hardly passes through the pore in comparison with a nearly spherically-shaped molecule, selectivity is improved. It can be considered that, for example, since ethanol more hardly passes through the pore than water, and molecules such as $CO_2$ and the like in gas more hardly passes through the pore than He and $H_2$ due to change in the aforementioned pore structure, selectivity of water/ethanol and $He/CO_2$ is improved.

INDUSTRIAL APPLICABILITY

A carbon membrane of the present invention can widely be used for a filter application, or the like, for selectively separating a specific substance (gas, liquid) from a mixture of a plurality of substances (gas, liquid).

The invention claimed is:

1. A porous carbon membrane having as a loaded component water, alcohol, ether, or ketone loaded on a surface or in a pore, or on the surface and in the pore thereof, wherein an average pore size is 0.2 to 1.0 nm.

2. A carbon membrane according to claim 1, wherein the loaded component has a molecular weight of 100 or less.

3. A carbon membrane according to claim 1, where the loaded component is linear alcohol or linear ether.

4. A carbon membrane according to claim 1, wherein the loaded component is at least one selected from methanol, ethanol, n-propanol, and n-butanol.

5. A carbon membrane according to claim 1, wherein a mass of the loaded component with respect to the mass of the membrane is 100 ppm or more.

6. A carbon membrane according to claim 1, wherein the mass of the loaded component with respect to the mass of the membrane is 5000 ppm or less.

7. A carbon membrane according to claim 1, which is formed on a surface of a porous substrate.

8. A carbon membrane according to claim 7, wherein the porous substrate is a ceramic porous body having an average pore size of 0.01 to 10 μm and a porosity of 30 to 70%.

9. A carbon membrane according to claim 1, wherein, by removing the loaded component by a heating treatment at 300° C. for one hour, a water permeation flux becomes 200% or less of that before the heating treatment, and an ethanol permeation flux becomes 200% or more of that before the heating treatment.

10. A carbon membrane according to claim 1, wherein the thickness is 0.01 to 10 μm.

11. A method for manufacturing a porous carbon membrane having, as a loaded component water, alcohol, ether, or ketone loaded on a surface or in a pore, or on the surface and in the pore thereof, said method comprising:
    forming a carbon membrane on a surface of a hollow string-shaped or porous substrate to manufacture an untreated carbon membrane,
    allowing water, alcohol, ether, or ketone to permeate the untreated carbon membrane or immersing the untreated carbon membrane in water, alcohol, ether, or ketone, and
    then loading various components on a surface or in a pore, or on the surface and in the pore thereof by heat-drying at 50 to 200° C. wherein an average pore size is 0.2 to 1.0 nm.

12. A method for manufacturing a carbon membrane according to claim 11, wherein the carbon membrane is obtained by performing, 1 to 10 times, an operation of allowing the water, alcohol, ether, or ketone to permeate the untreated carbon membrane for 1 second to 5 hours at 0 to 200° C. with a permeation flex of 0.01 to 10 kg/m²·hour, followed by heat-drying at 50 to 200° C.

13. A method for manufacturing a carbon membrane according to claim 11, wherein the carbon membrane is obtained by performing, 1 to 10 times, an operation of immersing the untreated carbon membrane in water, alcohol, ether, or ketone at 50 to 100° C. for 1 minute to 24 hours, followed by heat-drying at 50 to 200° C.

14. A method for manufacturing a carbon membrane according to claim 11, wherein the thickness of the carbon membrane is 0.01 to 10 μm.

15. A method for manufacturing a carbon membrane according to claim 11, wherein the porous substrate is a ceramic porous body having an average pore size of 0.01 to 10 μm and a porosity of 30 to 70%.

16. A method for manufacturing a carbon membrane according to claim 11, wherein an untreated carbon membrane is manufactured by forming a precursor by disposing a precursor of a carbon membrane on a surface of the porous substrate, followed by subjecting the precursor to a thermal treatment at 400 to 1200° C. to carbonize the precursor.

* * * * *